(12) United States Patent
Matsumoto

(10) Patent No.: US 11,319,253 B2
(45) Date of Patent: May 3, 2022

(54) SLURRIES FOR COMPOSITE MATERIALS

(71) Applicant: General Electric Company, Schenectady, NY (US)

(72) Inventor: Roger Lee Ken Matsumoto, Newark, DE (US)

(73) Assignee: General Electric Company, Schenectady, NY (US)

( * ) Notice: Subject to any disclaimer, the term of this patent is extended or adjusted under 35 U.S.C. 154(b) by 528 days.

(21) Appl. No.: 14/776,993

(22) PCT Filed: Jun. 12, 2013

(86) PCT No.: PCT/US2013/045389
§ 371 (c)(1),
(2) Date: Sep. 15, 2015

(87) PCT Pub. No.: WO2014/143117
PCT Pub. Date: Sep. 18, 2014

(65) Prior Publication Data
US 2016/0031762 A1    Feb. 4, 2016

Related U.S. Application Data

(60) Provisional application No. 61/788,751, filed on Mar. 15, 2013.

(51) Int. Cl.
*C04B 35/565* (2006.01)
*C04B 35/80* (2006.01)
(Continued)

(52) U.S. Cl.
CPC ............ *C04B 35/565* (2013.01); *B32B 18/00* (2013.01); *C04B 35/573* (2013.01);
(Continued)

(58) Field of Classification Search
CPC ....... C04B 35/565; C04B 35/806; C08K 3/00; C08K 3/0033; C08L 23/00; C08L 69/00; C08L 29/04; C08L 59/00; C08L 33/00
(Continued)

(56) References Cited

U.S. PATENT DOCUMENTS 3,953,562 A    4/1976 Hait et al.
4,324,843 A    4/1982 Brennan et al.
(Continued)

FOREIGN PATENT DOCUMENTS

CA    2 012 240 C    7/2004
CN    1502586 A      6/2004
(Continued)

OTHER PUBLICATIONS

Unofficial English Translation of Chinese Office Action issued in connection with related CN Application No. 201380074762.X dated Jun. 27, 2016.
(Continued)

*Primary Examiner* — Jane L Stanley
(74) *Attorney, Agent, or Firm* — Dority & Manning, P.A.

(57) ABSTRACT

Slurry and tape compositions include particles of a precursor that converts to a ceramic material when heated to a firing temperature, at least one binder that is capable of adhering the particles of the ceramic precursor together to form a pliable prepreg tape, at least one liquid plasticizer, and at least one solvent in which the binder is dissolved. The solvent may be sufficiently volatile to evaporate from the slurry composition during formation of the tape, yet the tape may also be pliable as a result of the slurry composition containing a sufficient amount of the liquid plasticizer.

9 Claims, 1 Drawing Sheet

(51) Int. Cl.
*C04B 35/626* (2006.01)
*B32B 18/00* (2006.01)
*C04B 35/638* (2006.01)
*C04B 35/632* (2006.01)
*C04B 35/634* (2006.01)
*C04B 35/573* (2006.01)

(52) U.S. Cl.
CPC ........ *C04B 35/6264* (2013.01); *C04B 35/632* (2013.01); *C04B 35/638* (2013.01); *C04B 35/6342* (2013.01); *C04B 35/63408* (2013.01); *C04B 35/63416* (2013.01); *C04B 35/63424* (2013.01); *C04B 35/63464* (2013.01); *C04B 35/80* (2013.01); *C04B 2235/5244* (2013.01); *C04B 2235/60* (2013.01); *C04B 2235/6025* (2013.01); *C04B 2235/616* (2013.01); *C04B 2237/38* (2013.01)

(58) Field of Classification Search
USPC ................................ 524/284; 427/379, 385.5
See application file for complete search history.

(56) References Cited

U.S. PATENT DOCUMENTS

| | | | |
|---|---|---|---|
| 4,710,227 A * | 12/1987 | Harley | B82Y 30/00 149/47 |
| 4,816,072 A * | 3/1989 | Harley | A61L 2/0017 106/287.18 |
| 4,898,631 A | 2/1990 | Collins, Jr. | |
| 4,965,039 A | 10/1990 | Schuetz | |
| 4,997,698 A | 3/1991 | Oboodi et al. | |
| 5,015,540 A | 5/1991 | Borom et al. | |
| 5,053,364 A | 10/1991 | Ray | |
| 5,330,854 A | 7/1994 | Singh et al. | |
| 5,336,350 A | 8/1994 | Singh | |
| 5,439,627 A | 8/1995 | De Jager | |
| 5,628,938 A | 5/1997 | Sangeeta et al. | |
| 5,985,460 A | 11/1999 | Wang et al. | |
| 6,024,898 A | 2/2000 | Steibel et al. | |
| 6,187,256 B1 | 2/2001 | Aslan et al. | |
| 6,258,737 B1 | 7/2001 | Steibel et al. | |
| 6,403,158 B1 | 6/2002 | Corman | |
| 6,503,441 B2 | 1/2003 | Corman et al. | |
| 7,080,441 B2 | 7/2006 | Braun | |
| 7,083,698 B2 | 8/2006 | Engwall et al. | |
| 7,632,369 B2 | 12/2009 | Sato et al. | |
| 7,686,990 B2 | 3/2010 | Gray | |
| 2003/0209534 A1 | 11/2003 | Ferguson | |
| 2004/0067316 A1 | 4/2004 | Gray et al. | |
| 2007/0096371 A1 | 5/2007 | McGuigan et al. | |
| 2008/0232032 A1 | 9/2008 | Jones et al. | |
| 2009/0214845 A1 | 8/2009 | Corman et al. | |
| 2011/0061714 A1 | 3/2011 | Keller | |
| 2011/0150663 A1 | 6/2011 | Manicke et al. | |
| 2013/0157037 A1 * | 6/2013 | Matsumoto | B32B 5/02 428/292.1 |

FOREIGN PATENT DOCUMENTS

| | | |
|---|---|---|
| CN | 102120703 A | 7/2011 |
| CN | 102503378 A | 6/2012 |
| JP | S51-19009 A | 2/1976 |
| JP | H03-65570 A | 3/1991 |
| JP | H06-40764 A | 2/1994 |
| JP | H08-255510 A | 10/1996 |
| JP | 2004-043197 A | 2/2004 |
| JP | 2008-098312 A | 4/2008 |
| JP | 2010-260785 A | 11/2010 |
| WO | 2010051345 A2 | 5/2010 |

OTHER PUBLICATIONS

U.S. Non-Final Office Action issued in connection with related U.S. Appl. No. 13/325,494 dated Jul. 26, 2016.
Roger Lee Ken Matsumoto et al., filed May 4, 2016, U.S. Appl. No. 15/146,132.
Roger Lee Ken Matsumoto, filed Dec. 14, 2011, U.S. Appl. No. 13/325,494.
Liu et al., "Combinatorial Study of Ceramic Tape-Casting Slurries", ACS Combinatorial Science, vol. No. 14, Issue No. 3, pp. 205-210, Mar. 12, 2012.
Non-Final Rejection towards corresponding U.S. Appl. No. 13/325,494 dated Mar. 14, 2013.
Final Rejection towards corresponding U.S. Appl. No. 13/325,494 dated Aug. 8, 2013.
International Search Report and Written Opinion issued in connection with corresponding PCT Application No. PCT/US2013/045389 dated Oct. 28, 2013.
Non-Final Rejection towards corresponding U.S. Appl. No. 13/325,494 dated Aug. 28, 2014.
Machine Translation and Notification of Reasons for Refusal issued in connection with corresponding JP Application No. 2016-500082 dated Sep. 5, 2017.
Office Action issued in connection with corresponding EP Application No. 13731223.7 dated Sep. 8, 2017.

* cited by examiner

SLURRIES FOR COMPOSITE MATERIALS

BACKGROUND OF THE INVENTION

Embodiments of the present invention generally relate to composite articles and processes for their production. More particularly, an embodiment of the present invention is directed to slurry and tape compositions that are suitable for use in the production of ceramic matrix composite (CMC) articles and are safer to produce, use and transport.

Higher operating temperatures for gas turbines are continuously sought in order to increase their efficiency. Though significant advances in high temperature capabilities have been achieved through formulation of iron, nickel and cobalt-base superalloys, alternative materials have been investigated. CMC materials are a notable example because their high temperature capabilities can significantly reduce cooling air requirements. CMC materials generally comprise a ceramic fiber reinforcement material embedded in a ceramic matrix material. The reinforcement material may be discontinuous short fibers dispersed in the matrix material or continuous fibers or fiber bundles oriented within the matrix material, and serves as the load-bearing constituent of the CMC in the event of a matrix crack. In turn, the ceramic matrix protects the reinforcement material, maintains the orientation of its fibers, and serves to dissipate loads to the reinforcement material. Silicon-based composites, such as silicon carbide (SiC) as the matrix and/or reinforcement material, are of particular interest to high-temperature applications, for example, high-temperature components of gas turbines including aircraft gas turbine engines and land-based gas turbine engines used in the power-generating industry.

Examples of CMC materials and particularly SiC/Si—SiC (fiber/matrix) continuous fiber-reinforced ceramic composites (CFCC) materials and processes are disclosed in U.S. Pat. Nos. 5,015,540, 5,330,854, 5,336,350, 5,628,938, 6,024,898, 6,258,737, 6,403,158, and 6,503,441, and U.S. Patent Application Publication No. 2004/0067316. Such processes generally entail the fabrication of CMCs using multiple prepreg layers, each in the form of a "tape" comprising the desired ceramic fiber reinforcement material, one or more precursors of the CMC matrix material, and organic resin binders. According to conventional practice, prepreg tapes can be formed by impregnating the reinforcement material with a slurry that contains the ceramic precursor(s) and binders. The selection of the precursor will depend on the particular composition desired for the ceramic matrix of the CMC component. For example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the pliability of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix.

After allowing the slurry to partially dry and, if appropriate, partially curing the binders (B-staging), the resulting prepreg tape is laid-up with other tapes, and then debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo melt infiltration (MI) to fill the porosity and yield the CMC component. Specific processing techniques and parameters for the above process will depend on the particular composition of the materials.

An example of a CFCC material is schematically depicted in FIG. 1 as comprising multiple laminae 12, each derived from an individual prepreg tape that comprised unidirectionally-aligned reinforcement material 14 impregnated with a ceramic matrix precursor. As a result, each lamina 12 contains the reinforcement material 14 encased in a ceramic matrix 18 formed, wholly or in part, by conversion of the ceramic matrix precursor during firing and melt infiltration.

While processes and materials of the type described above have been successfully used to produce CMC components for gas turbines and other applications, slurries and prepreg tapes used in these processes contain significant amounts of solvents that pose environmental, health and safety issues. In particular, conventional slurries often require solvents in amounts of about 50 weight percent or more in order to yield tapes that are workable as a result of containing a sufficient amount of solvent, for example, about 10 to about 20 weight percent solvent. Typical solvents, including toluene and MIBK, are toxic, necessitating the processing and handling of the slurries and tapes in controlled ventilated areas. These solvents are also flammable, with the result that the tapes must be treated as hazardous freight when shipped. In addition, burn-off of the solvents during firing of the preform results in dimensional changes that interfere with the ability to produce CMC components of consistent dimensions. Though these disadvantages might be addressed by reducing the amount of solvent used, the result is excessively rigid tapes that may be unusable for producing composite components.

BRIEF DESCRIPTION OF THE INVENTION

The present invention provides compositions and processes for producing composite articles, and particularly to slurry and prepreg tape compositions that are safer to process, handle and transport, and also are capable of achieving greater dimensional consistency during processing to produce composite articles.

According to a first aspect of an embodiment of the present invention, a slurry composition is provided that contains a powder comprising particles of at least one precursor, at least one binder capable of adhering the particles of the precursor together to form a tape, at least one liquid plasticizer, and a solvent in which the binder is dissolved. The solvent is sufficiently volatile to evaporate from the slurry composition during forming of the tape so that the tape contains less than ten weight percent of the solvent, yet the tape is also pliable as a result of the slurry composition containing a sufficient amount of the liquid plasticizer.

A second aspect of an embodiment of the present invention is a nonflammable tape that comprises a fiber reinforcement material and a matrix material, the latter comprising a powder of precursor particles, one or more binders, one or more liquid plasticizers, and less than ten weight percent of one or more solvents. The tape is pliable as a result of containing a sufficient amount of the liquid plasticizer.

Another aspect of an embodiment of the present invention is a process of using a slurry composition to produce a nonflammable tape. The process includes forming the slurry composition to contain a powder comprising particles of at least one precursor, at least one binder, at least one liquid plasticizer, and a solvent in which the binder is dissolved. A fiber reinforcement material is impregnated with the slurry composition to produce a slurry-impregnated reinforcement material, and a portion of the solvent is then evaporated from the slurry-impregnated reinforcement material to form the tape in which the particles of the precursor are adhered together by a matrix material formed by the binder. A sufficient amount of the solvent evaporates during forming of the tape to result in the tape being nonflammable and containing less than ten weight percent of the solvent, yet the tape is also pliable as a result of the slurry composition containing a sufficient amount of the liquid plasticizer.

The tape may then be further used to form a preform, which is then heated to decompose the binder and the liquid plasticizer, convert the precursor to a ceramic material and thereby form a ceramic matrix for the ceramic fiber reinforcement material.

A technical effect of an embodiment of the present invention is that the slurry composition and prepreg tapes produced therefrom contain a limited amount of solvent, and yet the tapes are sufficiently pliable for use in lay-up processes used to produce composite materials. Suitable solvents are also less toxic than solvents typically used in the production of prepreg tapes for CMC articles, which allows the slurry and tapes to be processed and handled without requiring ventilation and allows the tapes to be shipped as non-regulated freight. Another technical effect is that, due to the limited amount of solvent in the tapes, a composite component produced from a preform formed with the tapes will undergo significantly less shrinkage, reducing dimensional changes that would otherwise interfere with the ability to produce composite components of consistent dimensions. The slurry composition and pliable prepreg tapes produced therefrom can be used to produce a wide variety of composite components, including but not limited to hot gas path components of gas turbines.

Other aspects and advantages of this invention will be better appreciated from the following detailed description.

DETAILED DESCRIPTION OF THE INVENTION

The present invention will be described in terms of processes for producing CMC articles, including CFCC articles. CMC materials of particular interest to an embodiment of the present invention are those containing silicon, such as CMC's containing silicon carbide as the reinforcement and/or matrix material, a particular example of which is continuous silicon carbide fibers in a matrix of silicon carbide. However, other composite materials are also within the scope of an embodiment of the present invention, including ceramics such as silicon nitride and silicides (intermetallics) such as niobium silicide and molybdenum silicide. While various applications are foreseeable, particular applications for CMC articles of the type that can be produced with an embodiment of the present invention include components of gas turbine engines, such as combustor liners, blades, vanes, shrouds and other components located within the hot gas path of a gas turbine.

Figure 1:
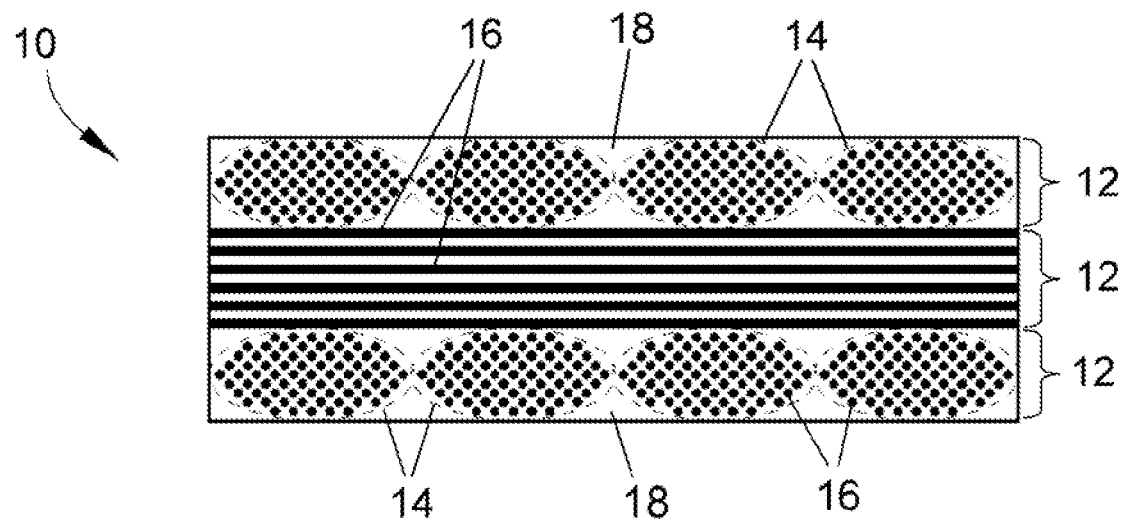
FIG. 1 schematically represents a fragmentary cross-sectional view of a CMC article.
Figure 2:
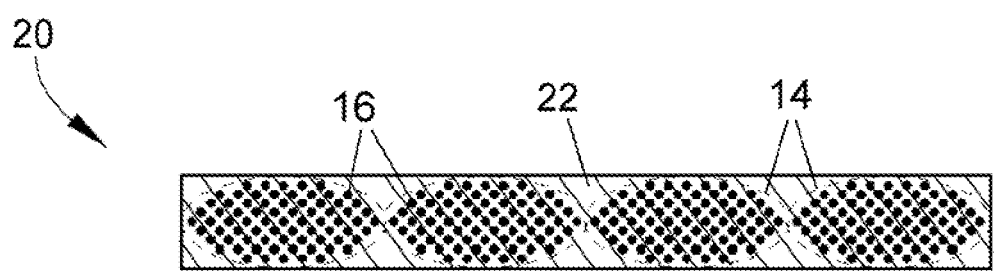
FIG. 2 schematically represents a fragmentary cross-sectional view of a prepreg tape of a type capable of being used to form the CMC article of FIG. 1.

The following discussion will make reference to FIGS. 1 and 2. FIG. 1 was previously noted as representative of a CFCC component 10, though other types of CMC materials are also within the scope of embodiments of the present invention. As a CFCC material, the component 10 may offer light weight, high strength, and high stiffness for a variety of high temperature load-bearing applications. The CFCC component 10 is represented as comprising multiple laminae 12, each derived from an individual prepreg tape. Each lamina 12 contains a ceramic fiber reinforcement material 14 encased in a ceramic matrix 18 formed, wholly or in part, by conversion of a ceramic matrix precursor.

As portrayed in FIGS. 1 and 2, the reinforcement material 14 may be in the form of unidirectional arrays of tows, each containing continuous fibers (filaments) 16. As an alternative to unidirectional arrays of tows, the reinforcement material 14 may include fibers 16 arranged to form unidirectional arrays of fibers. In addition, the reinforcement material 14 may include tows that are woven to form a two-dimensional fabric or a woven three-dimensional fabric formed by braiding, for example.

Suitable fiber materials may depend on the particular application. Notable but nonlimiting examples of CFCC materials have been developed by the General Electric Company under the name HiPerComp®, and contain continuous silicon carbide fibers in a matrix of silicon carbide and elemental silicon or a silicon alloy. Suitable fiber diameters, tow diameters and center-to-center tow spacings will depend on the particular application, the thicknesses of the particular lamina 12 and the tape 20 from which it was formed, and other factors, and therefore are not represented to scale in FIG. 1 or 2.

FIG. 2 schematically represents a prepreg tape 20 of a type from which each lamina 12 of FIG. 1 can be formed. As such, the tape 20 is represented as containing reinforcement material 14 in the form of tows of ceramic fibers 16, which will serve as the reinforcement phase for the component 10. The reinforcement material 14 is represented in FIG. 2 as being encased within a solid matrix material 22 formed by, among other things, one or more organic binders and one or more ceramic precursors that will form the ceramic matrix 18 of the component 10. The matrix material 22 is formed by applying a slurry composition to the reinforcement material 14, and then partially drying the slurry composition to permit handling of the tape 20. Various techniques can be used to apply the slurry composition to the reinforcement material 14, for example, by applying the slurry composition directly to a continuous strand of tow as the tow is wound onto a drum.

Following the winding operation, the slurry composition can be allowed to partially dry, after which the resulting prepreg tape 20 can be removed from the drum, laid-up with other tapes, and then debulked at elevated pressures and temperatures to form a preform. The preform can then be heated in vacuum or in an inert atmosphere to decompose the binders and convert the ceramic matrix precursor into the ceramic material of the matrix 18 of the CMC component 10. The component 10 may further undergo melt infiltration to fill porosity created within the matrix 18 as a result of decomposition of the binder during firing. As a particular example, in the production of SiC/Si—SiC CMC materials, the binder can be chosen to form a carbon char as a result of the firing process, which can then be reacted with molten silicon or a molten silicon alloy during melt infiltration to form additional SiC matrix material. Specific processing techniques and parameters for the above process will depend on the particular composition of the materials and are otherwise within the capabilities of those skilled in the art, and therefore will not be discussed in any detail here.

Suitable ceramic precursors for the slurry composition will depend on the composition desired for the ceramic matrix 18 of the component 10. For the above-noted Si—SiC matrix materials used in gas turbine applications, suitable precursors include SiC, carbon, and/or one or more other carbon-containing particulate materials.

Various other constituents may be included in the slurry composition according to embodiments of the present invention. For example, the slurry composition may further contain a filler material, such as silicon carbide particles or other ceramic particulate materials that are not converted or otherwise reacted during the firing process. The ceramic precursor and any additional particulate material(s) constitute the solid constituents of the slurry composition, and may account for about 30 to about 60 weight percent of the slurry composition, or about 35 to about 50 weight percent of the slurry composition.

The balance of the slurry composition may include liquid constituents such as at least one organic binder, at least one solvent in which the binder is dissolved, and at least one plasticizer.

Suitable binders for use in the slurry composition of embodiments of the present invention may include, but are not limited to polymeric materials such as polyethylenes, polycarbonates, polyvinyl acetates, polyvinyl alcohols, polyvinyl butyral (PVB), and acrylics. The selection of a suitable binder may depend in part on compatibility with the rest of the slurry components.

According to an embodiment of the present invention, the binder may be present in an amount from about 5 to about 10 weight percent of the slurry composition, or from about 6 to about 7 weight percent of the slurry composition. Depending on their molecular weight, the binders may decompose at temperatures higher than temperatures necessary to prepare and debulk the prepreg tape 20 and less than temperatures employed to fire the preform and convert the ceramic precursor to the desired ceramic material of the matrix 18.

Suitable solvents for use in the slurry composition of embodiments of the present invention may include, but are not limited to alcohols, acetates, toluene, acetone, ketones, glycols and xylene. For example, solvents may include alcohols including but not limited to ethanol, isopropanol, and butanol. Solvents such as toluene and ketones, such as MIBK, may pose environmental, safety and health issues as a result of being toxic, necessitating that such slurry compositions and prepreg tapes 20 formed therefrom must be handled in controlled environments. Alcohols are effective solvents for the various suitable binders, and are much less toxic than toluene and MIBK. In addition, alcohols readily evaporate at temperatures used to prepare and debulk the prepreg tape 20, with the result that a slurry composition containing about 45 weight percent or more of the solvent can produce a prepreg tape 20 having a solvent content of less than about 7 weight percent. Furthermore, solvent emissions during the evaporation of alcohols from the tape 20 are below levels requiring ventilation, and tapes 20 containing less than about 10 weight percent alcohols can be shipped as non-regulated freight.

In contrast to prior practices in which prepreg tapes often have a solvent content of 10 weight percent or more, the tape 20 of an embodiment of the present invention may have a solvent content of less than about 10 weight percent, or less than about 7 weight percent. To compensate for the limited amount of solvent in the tape 20, which is ordinarily required to produce a pliable prepreg tape, the slurry composition may be formulated so that the tape 20 produced therefrom will contain a sufficiently greater amount of the plasticizer capable of conferring the required pliability of the tape 20.

Suitable plasticizers for use in the slurry composition of an embodiment of the present invention may include, but are not limited to phthalates, such as dibutyl phthalate or butyl benzyl phthalate, triethyleneglycol bis(2-ethyl hexanoate), adipates, glycols, linseed oil, and castor oil. Suitable plasticizers according to an embodiment of the present invention may be compatible with the binders, be in liquid form at room temperature, with the result that this plasticizer may be added as a liquid when preparing the slurry composition under room temperature conditions. Furthermore, suitable plasticizers may be non-toxic and decompose at temperatures above 350° C., which is greater than temperatures necessary to prepare and debulk the prepreg tape 20, but less than temperatures employed to fire the preform and convert the ceramic precursor to the desired ceramic material of the matrix 18.

As noted above, a sufficient amount of plasticizer may be included in the slurry composition to compensate for the relatively low solvent content of the prepreg tape 20 to promote the pliability of the tape 20. According to an embodiment of the present invention, the plasticizer may be present in the slurry composition in an amount of about 5 to about 10 weight percent of the composition, or about 6 to about 7 weight percent of the composition.

After a slurry composition is prepared to have the above-noted constituents and amounts, the composition may be applied to the reinforcement material 14 by any suitable process. The slurry composition is then allowed to partially dry through partial evaporation of the solvent, yielding the pliable prepreg tape 20 comprising the reinforcement material 14 embedded in the matrix material 22, the latter of which is formed essentially by the ceramic precursor, the binder, the plasticizer, and any particulate filler material, as well as the remaining portion of the solvent that did not evaporate during formation of the tape 20. As a result of solvent loss, the matrix material 22 within the tape 20 may contain, by weight, about 60 to about 70% solid powder constituent (comprising the ceramic precursor and any additional particulate materials), about 10 to about 18% binder, about 10 to about 14% plasticizer, and less than about 10% solvent. According to an embodiment of the present invention, the solvent content of the matrix material in the tape may be less than about 7% by weight.

The tape 20 may then be laid-up with other tapes, and the prepreg tape stack may be debulked at elevated pressures and temperatures to form a preform. The debulking temperature may be below the decomposition temperature of the binder and plasticizer. Following debulking, during which additional solvent is evaporated, each tape 20 may contain less than about 1 weight percent of the solvent, or less than about 0.1 weight percent solvent. As a result of the additional loss of solvent, the tape 20 may contain about 25 to about 40 weight percent of the solid powder constituent formed by the ceramic precursor and any additional particulate materials, about 4 to about 8 weight percent of the binder, and about 4 to about 8 weight percent of the plasticizer, with the balance being the reinforcement material 14.

The preform may then be heated in a vacuum or inert atmosphere to a temperature sufficient to decompose the binder and the plasticizer, and then to a firing temperature sufficient to convert the ceramic precursor within the matrix material 22 into the ceramic material of the matrix 18 of the CMC component 10. As previously noted, the component 10 may further undergo melt infiltration to fill any porosity created within the matrix 18 as a result of decomposition of the binder during firing.

While discussed above in terms of prepreg processing of tapes including unidirectionally-aligned reinforcement material, an embodiment of the present invention may also be applied to fiber-reinforced composites made using other processes, including techniques suitable for alternative fiber architectures. For example, alternative fiber architectures, may include, but are not limited to two-dimensional or three-dimensional woven fiber architectures.

According to an embodiment of the present invention, after a fiber coating is applied, a preform including layers of woven fabric may be impregnated with the slurry composition of an embodiment of the present invention in accordance with known slurry impregnation techniques. For example, the slurry may be impregnated using slurry cast techniques, followed by partial evaporation of the solvent and melt infiltration. Alternative techniques may involve external pressure or vacuum-assistance to introduce the slurry followed by heating to form the ceramic.

While the invention has been described in terms of specific embodiments, it is apparent that other forms may be adopted by one skilled in the art. Therefore, the scope of the invention is to be limited only by the following claims.

What is claimed is:

1. A process of using a slurry composition to produce a pliable nonflammable tape, the process comprising:
    forming the slurry composition to contain 30 to 60 weight percent of a powder comprising particles of at least one precursor; 5 to 10 weight percent of at least one binder; 5 to 10 weight percent of at least one liquid plasticizer; and a solvent in which the binder is dissolved, wherein the solvent is about 45 weight percent or more of the slurry composition, and wherein the at least one precursor comprising SiC, carbon, and/or one or more other carbon-containing particulate materials;
    impregnating a fiber reinforcement material with the slurry composition to produce a slurry-impregnated reinforcement material; and
    evaporating at least a portion of the solvent from the slurry-impregnated reinforcement material to form the tape in which the particles of the precursor are adhered together by a matrix material;
    wherein a sufficient amount of the solvent evaporates to result in the tape being nonflammable and containing less than about 10 weight percent of the solvent, yet the tape is also pliable as a result of containing a sufficient amount of the liquid plasticizer.

2. The process according to claim 1, wherein the binder is selected from the group consisting of polyethylenes, polycarbonates, polyvinyl acetates, polyvinyl alcohols, polyvinyl butyral (PVB), and acrylics.

3. The process according to claim 1, wherein the solvent is selected from the group consisting of ethanol, isopropanol, butanol, acetates, toluene, acetone, ketones, glycols and xylene.

4. The process according to claim 1, wherein the solvent constitutes less than about 7 weight percent of the tape.

5. The process according to claim 1, wherein the liquid plasticizer is selected from the group consisting of dibutyl phthalate, butyl benzyl phthalate, triethyleneglycol bis(2-ethyl hexanoate), adipates, glycols, linseed oil, and castor oil.

6. The process according to claim 1, wherein the liquid plasticizer constitutes about 4 to about 8 weight percent of the tape.

7. The process according to claim 1, wherein the matrix material contains:
    about 60 to about 70 weight percent of the powder;
    about 10 to about 18 weight percent of the binder;
    about 10 to about 14 weight percent of the liquid plasticizer; and
    less than about 7 weight percent of the solvent.

8. The process according to claim 1, further comprising:
    using the tape to form a preform;
    heating the preform to decompose the binder and the liquid plasticizer; and then
    further heating the preform to convert the precursor to a ceramic material, the ceramic material forming a ceramic matrix for the fiber reinforcement material.

9. The process according to claim 8, wherein the process produces a ceramic matrix composite component.

* * * * *